United States Patent Office 2,984,907
Patented May 23, 1961

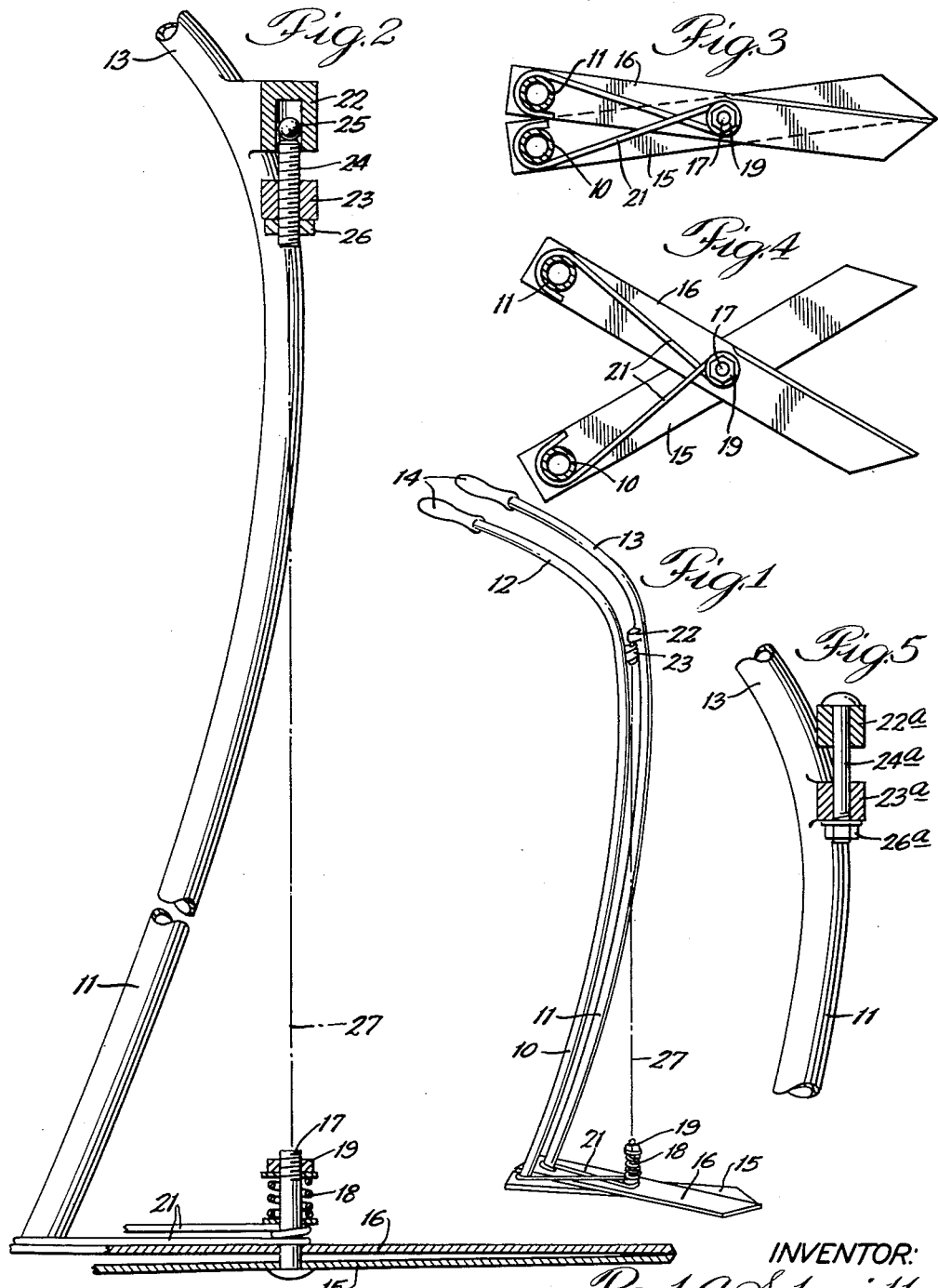

2,984,907
SHEARS
Paul A. Schmidt, Earlville, Ill.
Filed Mar. 14, 1960, Ser. No. 14,832
3 Claims. (Cl. 30—248)

This invention relates to shears and more particularly to long handled shears for trimming grass, and the like.

Various different types of long handled shears have heretofore been proposed, but none of them has been completely satisfactory. One of the principal difficulties has been the maintenance of proper cutting contact between the blades despite the fact that the blades may warp slightly during heat treatment. With the blades pivotally connected and held together by rigid pivot members a slight degree of warpage may result in the blades losing cutting contact with each other.

It is one of the objects of the present invention to provide shears which are simple and inexpensive in construction and extremely light in weight for easy handling and in which the desired cutting contact between the blades is maintained in spite of slight warpage of the blades.

According to a feature of the invention, the handles are connected by a bearing at the upper part of the handles which is constructed for a slight amount of axial movement and the blades are connected by a loose pivot and are resiliently urged together by a spring.

The above and other objects and features of the invention will be more readily apparent from the following description when read in connection with the accompanying drawing, in which:

Figure 1 is a perspective view of a grass cutting shears embodying the invention;

Figure 2 is a partial enlarged side view with parts in section;

Figures 3 and 4 are horizontal sections showing the blades and handles in different positions; and Figure 5 is a partial section showing a different bearing construction.

The shears, as shown, comprises a pair of elongated handle rods 10 and 11 which are preferably tubular for lightness and which are bent over on one end to form handle portions 12 and 13. The handle portions may carry grips 14 by which they may be conveniently gripped by an operator to turn the handle rods relative to each other in a clipping action.

The lower ends of the handle rods are rigidly secured to the rear ends of cutting blades 15 and 16, respectively, which are loosely pivoted together intermediate their ends by a pivot pin 17. As best seen in Figure 2, the pivot pin 17 extends loosely through openings in the blades 15 and 16 and has a spring 18 coiled therearound acting between the upper blade 16 and a nut 19 on the pivot pin to urge the blades vertically together to produce cutting pressure therebetween. Preferably the ends of the spring 18 extend to the handles and are hooked over the handles, as indicated at 21 in Figure 1, so that the spring 18 in addition to acting as a compression spring acts as a torsion spring tending to urge the handles together whereby the blades will be moved toward each other.

The handle rods are connected adjacent to their upper ends remote from their blades by a bearing which is designed according to the present invention not only to connect the handle rods for pivoting, but to permit a slight degree of relative axial movement. This bearing construction, as best seen in Figures 1 and 2, comprises a downwardly opening cup-shaped socket member 22 fixedly secured to the handle rod 12 adjacent to the upper end thereof as by welding or brazing. A bracket 23 is similarly secured to the handle rod 10 and has a screw 24 threaded therethrough and extending into the socket of the member 22 for relative sliding and turning movement. Preferably the upper end of the pin 24 is hollowed and a bearing ball 25 is mounted between the upper end of the pin and the bottom of the socket to take any thrust therebetween without creating a high friction.

Figure 5 illustrates an alternative construction of the upper bearing. As shown, brackets 22a and 23a are secured to the handle rods 10 and 11, respectively, and are journalled together through a bolt 24a extending through openings therein. The bolt is headed at one end to engage the upper end of the bracket 22a and carries a nut 26a at its lower end engageable with the bottom of the bracket 23a. In this way, the handle rods are journalled together near their upper ends while a limited amount of relative vertical movement therebetween is permitted in the same manner as with the bearing construction of Figures 1 and 2.

Preferably the blades 15 and 16 are not exactly parallel to each other, but diverge at a very slight angle at their cutting tips toward their heel portions, as shown in exaggerated form in Figure 2. With the blades slightly out of parallel, as shown, cutting pressure tends to be maintained completely to the cutting tips, the spring 18 flexing slightly during operation to maintain proper cutting pressure between the blades. Thus even though the blades are warped slightly during manufacture they will still be maintained in cutting contact along their full length.

Another advantage achieved by the construction of the present invention is what may be called "elbow action" due to the swinging out of the lower ends of the handle rods 10 and 11. It will be noted that with the construction shown the pivotal axis 27, on which the handle rods and blades move relative to each other, is closely adjacent to the upper ends of the handle rods, but is spaced appreciably from the lower ends of the handle rods where they are connected to the blades. The lower ends of the handle rods and the blades form what may be called "elbows" which swing away from each other when the handle portions 14 are separated to open the blades and which swing toward each other when the handle portions are brought together to close the blades in a cutting stroke. Since the upper ends of the handle rods remain close together at all times and the lower ends swing in and out, as defined, the handle rods will produce a turning or twisting action on the blades. Thus, as the handles are separated to open the blades, the blades will be twisted in a direction such that their cutting edges tend to contact each other while the remaining portions of the blades tend to move away from each other. This action insures that the cutting edges of the blades will be maintained in contact with each other for proper cutting even though there may be some warpage or twist in the blades themselves as a result of the treatment thereof. This elbow action added to the ability of the blades to move vertically toward and away from each other insures proper cutting operation under all operating conditions despite slight warpage of the blades or other similar manufacturing inaccuracies.

While one embodiment of the invention has been shown and described herein, it will be understood that it is illustrative only and not to be taken as a definition of the scope of the invention, reference being had for this purpose to the appended claims.

What is claimed is:

1. A long handled shears for trimming grass and the like comprising a pair of elongated handle rods lying side by side and terminating at their upper ends in angularly extending handles to be gripped by an operator to turn the rods relative to each other, a pair of crossed cutting blades each rigidly secured at one end to the lower end of one of the handle rods and projecting laterally therefrom, a pivot loosely connecting the blades intermediate their ends for relative pivoting and including a spring urging the blades together in a generally vertical direction, and a bearing interconnecting the handle rods adjacent to their upper ends and constructed and arranged to provide for limited relative lengthwise movement thereof, said handle rods lying generally parallel when the cutting blades are in their closed position.

2. The shears of claim 1 in which the bearing lies closely adjacent to the handle rods with its axis at an acute angle thereto and aligned with said pivot.

3. A long handled shears for trimming grass and the like comprising a pair of elongated handle rods lying side by side and terminating at their upper ends in angularly extending handles to be gripped by an operator to turn the rods relative to each other, a pair of crossed cutting blades each rigidly secured at one end to the lower end of one of the handle rods and projecting laterally therefrom, a pivot pin loosely connecting the blades intermediate their ends and extending laterally thereto, a coil spring coiled around the pivot and having its ends connected to the handle rods and urging the free ends of the blades to turn relatively toward each other about the pivot pin, the spring being compressed between one end of the pivot and the adjacent blade to urge the blades together in a generally vertical direction, and a bearing interconnecting the handle rods adjacent to their upper ends and lying closely adjacent to the handle rods with its axis projected through the pivot pin, said handle rods lying generally parallel when the cutting blades are in their closed position.

References Cited in the file of this patent

UNITED STATES PATENTS

| | | |
|---|---|---|
| 1,072,151 | Norcross | Sept. 5, 1913 |
| 1,845,798 | Keiser | Feb. 16, 1932 |
| 2,679,096 | Wallace | May 25, 1954 |
| 2,689,401 | Kalish | Sept. 21, 1954 |
| 2,873,525 | Wallace | Feb. 17, 1959 |